March 18, 1958  J. A. ECKHOFF  2,826,987
POCKET CHECK WRITER

Filed May 2, 1956  3 Sheets-Sheet 1

INVENTOR.
JOSEPH A. ECKHOFF
BY
ATTORNEY

March 18, 1958   J. A. ECKHOFF   2,826,987
POCKET CHECK WRITER
Filed May 2, 1956   3 Sheets-Sheet 2
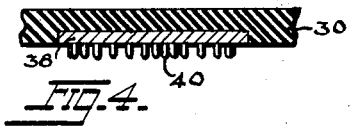
Fig. 4.
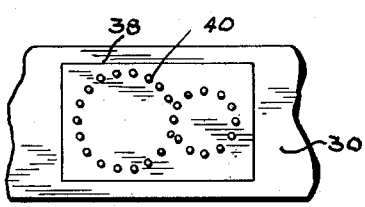
Fig. 5.
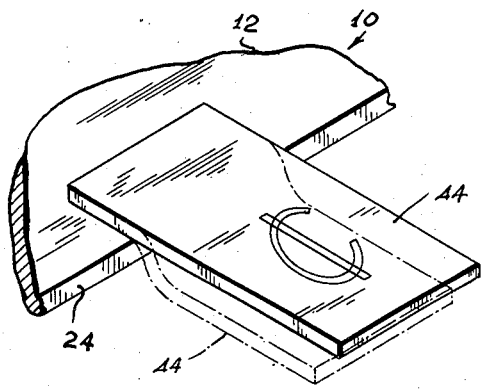
Fig. 6.
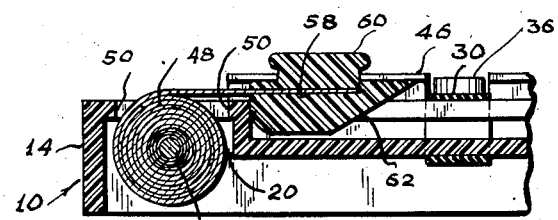
Fig. 7.
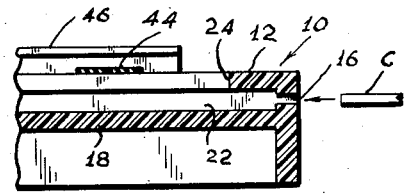
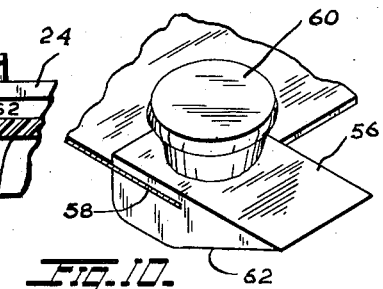
Fig. 10.
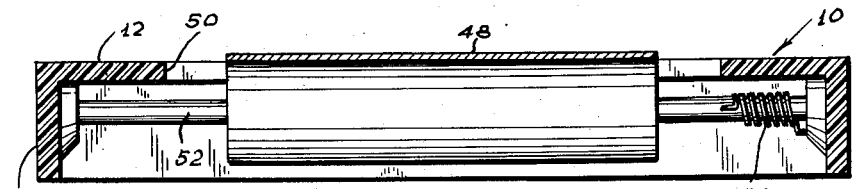
Fig. 9.
INVENTOR.
JOSEPH A. ECKHOFF
BY
ATTORNEY March 18, 1958  J. A. ECKHOFF  2,826,987
POCKET CHECK WRITER
Filed May 2, 1956  3 Sheets-Sheet 3
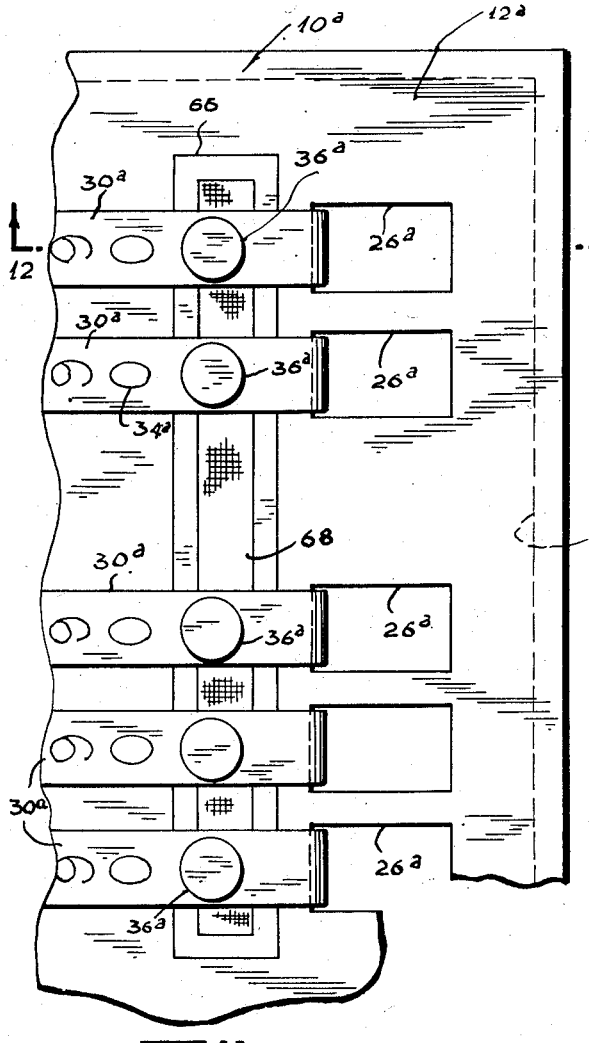
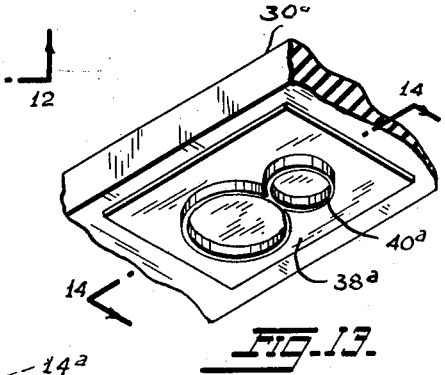
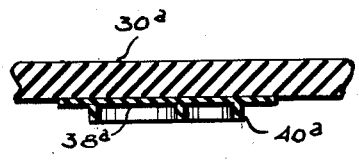
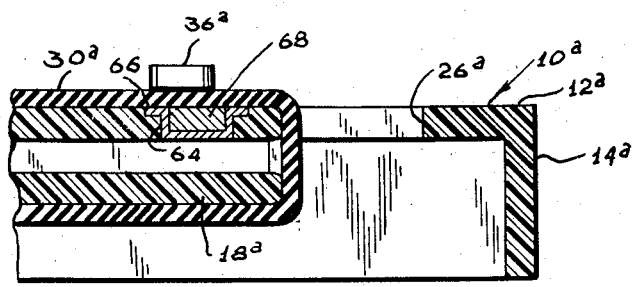
INVENTOR.
JOSEPH A. ECKHOFF
BY
ATTORNEY

United States Patent Office 2,826,987
Patented Mar. 18, 1958

2,826,987

POCKET CHECK WRITER

Joseph A. Eckhoff, Flushing, N. Y.

Application May 2, 1956, Serial No. 582,280

7 Claims. (Cl. 101—19)

This invention relates to check writing devices and, more particularly, has reference to a device adapted to be carried in the pocket, kept upon one's desk, etc.

As is well known, when the amount for which a check is drawn is inscribed on the check in ink, said amount is often subject to alteration by individuals seeking to commit fraud. This may result in serious loss to the person drawing the check, or alternatively, may result in loss to a bank or to a place of business.

Check writing machines are of course well known, but obviously, these are too expensive for use by the ordinary individual, as for example, a householder who pays his domestic expenses by check.

In this connection, it has heretofore been proposed to provide pocket check writing devices, so that the amount of money for which the check is drawn can be so marked upon the check as to insure to the maximum extent against fraudulent alteration. The main object of the present invention, in this regard, is to provide a generally improved check writing device to be carried in the pocket or kept in or on one's desk, to permit its use by those to whom the expense of a large, conventional check writing machine represents an uneconomical outlay of funds.

Summarized briefly, the pocket check writing device devised for the purpose of carrying out the above stated object comprises, in the embodiment illustrated and described herein, a support plate having a longitudinally and centrally extending slot, and formed with a guideway communicating with the slot. A check is adapted to be inserted in the guideway through a slot provided in one end of the plate, so as to be partially exposed through the first-named slot. Endless, flexible bands, carrying numerical indicia "1" to "0" are mounted upon the plate, extending transversely of the longitudinal slot. Said bands are adapted to be swiftly adjusted to locate a selected numerical indicium over the slot, and on the underside of the top flight of the endless band there is provided a series of dies, which can be either of metal or rubber, corresponding to the numerical indicia marked upon the band. By selected positioning of the several bands, selected indicia are disposed over the exposed portion of the check. Then, a slide element is shifted longitudinally of the first-named slot, and has a cam surface adapted to press each band downwardly in turn to force the die element against the check, thus to imprint the amount for which the check is written.

Another object of the invention is to provide a device of the nature referred to that will be simply designed, so as to be constituted, in large part, of readily molded plastic elments and inexpensive metal parts.

Another specific object is to provide a device of the nature referred to that will be flat, light construction, so as to permit it to be inserted in a suitable plastic or leather case that can be readily pocketed whenever the device is not in use.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a detail sectional view, the scale being enlarged above that of Fig. 3, taken on line 4—4 of Fig. 3, showing one of the die elements in section.

Fig. 5 is a bottom plan view of the fragmentary portion of the band shown in Fig. 4, showing the die element, said die element being of a metal type to perforate the check.

Fig. 6 is a greatly enlarged, fragmentary perspective view showing a flexible tab for providing a "cents" mark on the check.

Fig. 7 is an enlarged longitudinal sectional view, portions being broken away, on line 7—7 of Fig. 1 with the slide in rest position.

Fig. 8 is a fragmentary longitudinal sectional view on the same cutting plane as Fig. 7, the slide being partially advanced.

Fig. 9 is an enlarged transverse sectional view on line 9—9 of Fig. 8.

Fig. 10 is an enlarged, fragmentary perspective view of the slide.

Fig. 11 is an enlarged, fragmentary top plan view of a modified construction utilizing rubber die elements.

Fig. 12 is a sectional view on line 12—12 of Fig. 11.

Fig. 13 is an enlarged, fragmentary perspective view of one of the bands of the modified form, looking upwardly at the top flight thereof.

Fig. 14 is a sectional view on line 14—14 of Fig. 13.

Figure 1:
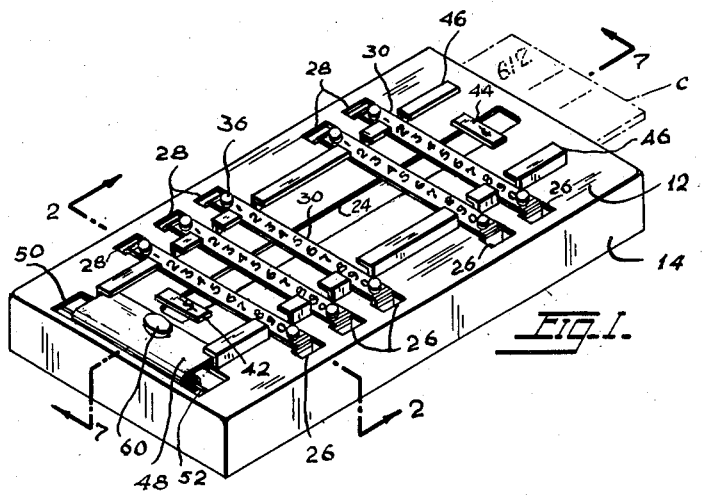
Fig. 1 is a perspective view of a check writing device formed according to the present invention, a check to be imprinted being shown in dotted lines.

Referring to the drawings in detail, the pocket check writing device constituting the present invention includes a shallow support or casing generally designated 10, said support being of rectangular, elongated formation, and comprising a piece of molded plastic formed to include a flat top plate 12 integral at its periphery with a depending flange 14 extending through the full periphery of the top plate.

In one end of the support 10 (see Fig. 7) there is formed a transverse slot 16, located just below the plane of the plate 12, said slot being formed in the flange 14 at one end of the support. Slot 16 is disposed just above a flat, wide check support plate 18, lying in a plane parallel to and closely spaced below the plane of the plate 12. The check support plate 18 at one end is integrally connected to the flange 14, at the end of the device having the slot 16. At its other end, the check support plate 18 terminates short of the opposite end of the support, and is integrally connected to the plate 12 through the medium of a connecting wall 20 extending the full width of the check support plate 18.

This defines a shallow, wide guideway 22 into which is insertable a conventional check C. The check is inserted through the slot 16, and is slidably shifted within the guideway 22 until the leading end thereof engages against the connecting wall 20, which constitutes an abutment limiting further inward movement of the check.

Formed in the plate 12, and extending longitudinally and centrally of the plate, is a wide slot 24, the ends of which are closed. The slot communicates with guideway 22, so that a portion of the inserted check is visible through the slot 24. On this portion the amount for which the check is written is imprinted by the die means to be presently described.

Formed in plate 12, adjacent one longitudinal edge thereof, is a row of openings 26. Along the opposite longitudinal edge of the plate 12 there is formed a corresponding row of openings 28. The openings of row 26 are aligned transversely of plate 12 with the corresponding openings 28 of the other row. As will be seen from Fig. 1, in each row three of the openings are disposed as one group, while the remaining two openings are disposed as a second group, a space of substantial breadth appearing between the two groups. The three openings of the first group receive endless bands 30 carrying the die elements used for imprinting numerals in the "dollars" portion of the amount imprinted upon the check. The two openings of the second group carry additional endless bands 30 bearing the die elements used for imprinting the "cents" portion of the check amount.

If desired, in the first group there can be an additional opening or openings, if amounts running, in the dollars portion, into four or five digits must be imprinted from time to time.

Figure 2:
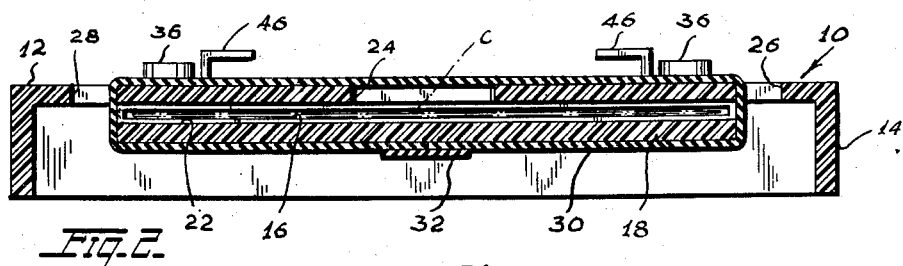
Fig. 2 is an enlarged, transverse sectional view substantially on line 2—2 of Fig. 1.
Figure 3:
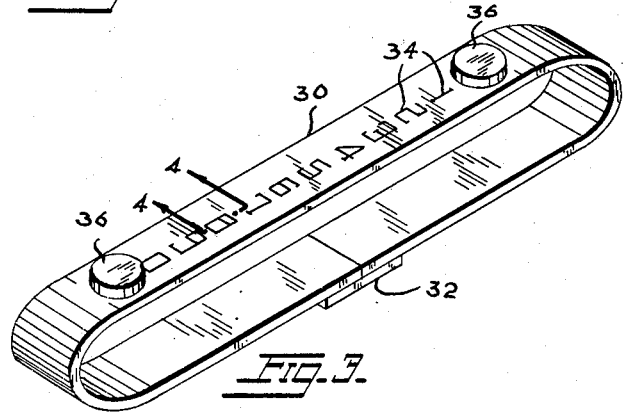
Fig. 3 is a perspective view, still further enlarged, of one of the bands per se.

The several endless bands 30 are all identical to one another, so that the description of one will suffice for all. As will be noted, each flexible endless band 30, which can be formed of thin rubber or the like, initially comprises an elongated strip of rubber, the ends of which are brought together (see Figs. 2 and 3) and connected through the medium of a connecting piece 32 also of flexible rubber material, which is cemented to the abutting end portions of the strip. This provides an endless band or loop, as shown in Figs. 2 and 3, having a top flight extending transversely of the plate 12 in contact with the top surface thereof and a bottom flight extending in contact with the underside of the check support plate 18. The bands are individually adjustable to locate a selected numerical indicium 34 in centered position over the longitudinal slot 24. It will be understood that the spacing of the indicium 34 is such that only one numeral will be positioned over the slot 24. At opposite ends of the top flight, there are provided upwardly projecting lugs or buttons 36 providing handles either of which can be employed for adjusting the band to a selected position. The bands 30 are preferably formed of soft rubber or the like, so as to be capable of passing about the bands defined at the opposite ends of the loop, said buttons 36 moving through the openings 26 or 28 as the case may be under these circumstances.

Referring to Figs. 4 and 5, in the underside of the top flight of each band, thin metal dies 38 are embedded or otherwise fixedly secured, these preferably being of a resilient material so as to permit flexure thereof where the band curves at the locations of the openings 26, 28. Depending from the underside of each die is a series of small conical projections 40. These are arranged to form a numerical indicium corresponding to and registered with a numerical marking 34 provided on the top surface of the band.

It will thus be seen that one can, by adjusting the several bands, locate in centered position over slot 24 the several dies needed to imprint a selected number in dollars and cents upon the portion of the check exposed through the slot. When the selected dies have been so positioned, they need only be depressed, to force the projections 40 into the material of the check, thereby to imprint the check with the desired amount.

When the selected dies are depressed, there are also depressed a pair of tabs 42 and 44 (Figs. 1 and 6). One of these, tabs 42 located to the left of the several bands, carries a die the projections of which form a dollar sign. The other, tab 44, located to the right of the several bands, carries a die the projections of which form a "cents" sign. Both tabs are of flexible material, and are secured at one end to the plate, the other end of the tab overlying slot 24 and carrying the die.

Means is provided for depressing the several bands 30 and the tabs 42 and 44 within the slot 24 to imprint the check with the desired amount. Said means is in the form of a slide carried by a flexible strip of cloth, thin plastic, or rubber. The sides of the strip are slidably engaged in confronting guides 46 extending longitudinally of the plate 12 adjacent opposite sides of slot 24, and interrupted at spaced intervals along their lengths to provide spaces through which extend the transversely disposed endless bands 30.

The strip has been designated at 48, and is wound in a roll extending transversely of one end of the support in a slot 50. The roll is coiled upon a shaft 52 journalled at its ends in bearing recesses provided in the opposite side walls of the support. A torsion spring 54 coiled about the shaft (Fig. 9) has one end anchored to the shaft and the other end anchored to the support 10, and is tensioned to normally turn the shaft in a roll-winding direction.

Referring to Figs. 7, 8 and 10, a depressor head 56 has a rearwardly opening slot 58 in which is fixedly secured the free end of strip 48. The head 56 includes an upwardly projecting knob 60 providing a handle, and on the underside of the head is a sloped cam surface 62. The head projects beyond the free end of strip 48, and normally is engaged against the abutment 20 as shown in Fig. 7.

Assuming that the selected dies are centered over slot 24 one grasps the knob and shifts the same longitudinally of slot 24. The head extends into the slot and accordingly, when the head is moved to the opposite end of the slot, the cam surface will bias downwardly the portions of the several bands overlying the slot 24, as shown in Fig. 8, to imprint the check. The tabs 42, 44 will also be biased downwardly, by the head. At the end of its travel, the head is free of the check permitting the check to be withdrawn.

When the head is shifted away from its normal position in this manner, the shaft 52 is turned against the restraint of spring 54. On release of the head to permit its return the spring will be free to turn the shaft in an opposite, roll-winding direction, thereby to return the head to its normal position. Abutment 20 may be padded to absorb the force of the impact of the head against the abutment when the head returns. Further, a soft facing may overlie the check support plate 18 to permit the projections 40 to move fully through the check C.

In Figs. 11-14 there is shown a modified form which utilizes rubber dies and an inking pad instead of check-perforating projections 40. This form of the device has a support 10ª including plate 12ª and depending flange 14ª. The support is identical to the first form of support except that adjacent its openings 26ª, it has an elongated opening extending parallel to the longitudinal, check-exposing slot thereof. Mounted in the opening is an inking pad including a receptacle 64 formed with an outwardly directed marginal flange 66 and in the receptacle there is an inked, fabric-covered pad 68.

The bands 30ª, in this form of the invention, are like bands 30, being provided with button-like projections 36ª and indicia 34ª, but instead of metallic dies having check-perforating projections, are provided with soft rubber imprinting elements 38ª cemented to the underside of the upper flight of each band. Elements 38ª are integrally formed with depending stamping elements 40ª similar to those provided on rubber stamps.

The surface of the inking pad is in contact with the underside of the top flight of the band and accordingly, one need only turn the band to whatever extent is necessary to cause a selected element 40ª to slide across the inking pad. This inks the stamping element, and the user then turns the band to center the desired element within the slot. Thereafter, the depressor head 56 is shifted longitudinally of the slot once again to depress the desired stamping elements against the check, on plate 18ª.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip.

2. A pocket check-writing device comprising a support having a guideway in which a check may be inserted, said support having a longitudinal slot communicating with the guideway to at least partially expose the check; means adjustable transversely of the support including a check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands.

3. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands, the support including confronting guides extending longitudinally of the slot at opposite sides thereof, said strip being slidably engaged at opposite sides thereof in said guides.

4. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands, the support including confronting guides extending longitudinally of the slot at opposite sides thereof, said strip being slidably engaged at opposite sides thereof in said guides, said support including a top plate in which said slot is formed, the guides being mounted on the top plate.

5. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the hands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands, the support including confronting guides extending longitudinally of the slot at opposite sides thereof, said strip being slidably engaged at opposite sides thereof in said guides, said support including a top plate in which said slot is formed, the guides being mounted on the top plate, the support further including a check support plate underlying the top plate and cooperating therewith in defining said guideway.

6. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands, the support including confronting guides extending longitudinally of the slot at opposite sides thereof, said strip being slidably engaged at opposite sides thereof in said guides, said support including a top plate in which said slot is formed, the guides being mounted on the top plate, the support further including a check support plate underlying the top plate and cooperating therewith in defining said guideway, said check support plate including an abutment at one end limiting movement of the check into the guideway, said abutment further limiting retraction of the head beyond said rest position thereof.

7. A pocket check-writing device comprising a support having a guideway in which a check may be inserted, said support having a longitudinal slot communicating with the guideway to at least partially expose the check; means adjustable transversely of the support including check-imprinting elements adapted for selective positioning in the slot over the exposed check; and means shiftable longitudinally of the slot adapted for depressing the selected elements against the check, said first means including a plurality of flexible, endless bands rotatably mounted on the support, said elements being mounted on the bands, the second means comprising a depressor head sliding within the slot and having a cam surface engaging the bands to bias downwardly the portions thereof extending across the slot, said second means further comprising a flexible strip wound in a roll rotatably mounted on the support, said head being secured to one end of the strip, said roll being spring urged to turn in a direction to retract the head to a normal, rest position out of engagement with the bands, the support including confronting guides extending longitudinally of the slot at opposite sides thereof, said strip being slidably engaged at opposite sides thereof in said guides, said support including a top plate in which said slot is formed, the guides being mounted on the top plate, the support further including a check support plate underlying the top plate and cooperating therewith in defining said guideway, said check support plate including an abutment at one end limiting movement of the check into the guideway, said abutment further limiting retraction of the head beyond said rest position thereof, the support having at the other end of the guideway a transverse slot through which the check may be inserted into and removed from the guideway.

References Cited in the file of this patent

UNITED STATES PATENTS

| | | |
|---|---|---|
| 1,465,388 | Dryer | Aug. 21, 1923 |
| 1,558,869 | Gulling | Oct. 27, 1925 |
| 1,574,830 | McCombs | Mar. 2, 1926 |
| 1,627,619 | Reubens | May 10, 1927 |
| 1,634,105 | Hoffman | June 28, 1927 |
| 1,737,136 | Zapanta | Nov. 26, 1929 |
| 2,328,861 | Thomas | Sept. 7, 1943 |
| 2,534,364 | Moll | Dec. 19, 1950 |
| 2,682,217 | Ginn | June 29, 1954 |